United States Patent [19]
Fuller et al.

[11] Patent Number: 5,869,595
[45] Date of Patent: Feb. 9, 1999

[54] POLYIMIDE CURING PROCESS AND IMPROVED THERMAL INK JET PRINTHEAD PREPARED THEREBY

[75] Inventors: Timothy J. Fuller, Pittsford; Ram S. Narang, Fairport, both of N.Y.

[73] Assignee: Xerox Corporation, Stamford, Conn.

[21] Appl. No.: 58,497

[22] Filed: Apr. 10, 1998

Related U.S. Application Data

[62] Division of Ser. No. 678,357, Jun. 13, 1996, Pat. No. 5,773,553.

[51] Int. Cl.$^6$ .............................. C08G 73/10; B41J 2/00; G01D 11/00
[52] U.S. Cl. ........................ 528/322; 528/310; 528/353; 347/56; 347/58; 347/59; 347/63; 347/64; 347/65; 347/67; 347/75; 347/100

[58] Field of Search .................................. 347/56, 58, 59, 347/63, 64, 65, 67, 75, 100; 528/353, 322, 310

[56] References Cited

U.S. PATENT DOCUMENTS

| | | | |
|---|---|---|---|
| 5,010,355 | 4/1991 | Hawkins et al. | 357/54 |
| 5,075,250 | 12/1991 | Hawkins et al. | 357/51 |
| 5,534,901 | 7/1996 | Drake | 347/63 |

*Primary Examiner*—P. Hampton-Hightower
*Attorney, Agent, or Firm*—Judith L. Ryorick

[57] ABSTRACT

Disclosed is a process which comprises reacting a polyimide precursor with borane. Also disclosed is a thermal ink jet printhead containing a layer comprising the product of this reaction.

18 Claims, 3 Drawing Sheets

POLYIMIDE CURING PROCESS AND IMPROVED THERMAL INK JET PRINTHEAD PREPARED THEREBY

This application is a divisional of application Ser. No. 08/678,357, filed Jun. 13, 1996 now U.S. Pat. No. 5,773,553.

BACKGROUND OF THE INVENTION

The present invention is directed to processes for curing polyimides and to thermal ink jet printheads containing polyimide components prepared by this process. More specifically, the present invention is directed to processes for curing polyimides by reacting polyimide precursors with borane. One embodiment of the present invention is directed to a process which comprises reacting a polyimide precursor with borane. Another embodiment of the present invention is directed to an ink jet printhead which comprises (i) an upper substrate with a set of parallel grooves for subsequent use as ink channels and a recess for subsequent use as a manifold, the grooves being open at one end for serving as droplet emitting nozzles, (ii) a lower substrate in which one surface thereof has an array of heating elements and addressing electrodes formed thereon, and (iii) a thick film layer deposited on the surface of the lower substrate and over the heating elements and addressing electrodes and patterned to form recesses therethrough to expose the heating elements and terminal ends of the addressing electrodes, said thick film layer comprising the reaction product of a polyimide precursor with borane, the upper and lower substrates being aligned, mated, and bonded together to form the printhead with the grooves in the upper substrate being aligned with the heating elements in the lower substrate to form droplet emitting nozzles. Yet another embodiment of the present invention is directed to a process for preparing an ink jet printhead which comprises the steps of:

(a) providing a photopatternable polyimide precursor polymer;

(b) depositing a thick film layer comprising the photopatternable polymer onto a lower substrate in which one surface thereof has an array of heating elements and addressing electrodes having terminal ends formed thereon, said photopatternable polymer being deposited onto the surface having the heating elements and addressing electrodes thereon;

(c) exposing the thick film layer to actinic radiation in an imagewise pattern, wherein the unexposed areas correspond to areas of the lower substrate having thereon the heating elements and the terminal ends of the addressing electrodes;

(d) removing the photopatternable polymer from the unexposed areas, thereby forming recesses in the thick film layer, said recesses exposing the heating elements and the terminal ends of the addressing electrodes;

(e) reacting the photopatternable polymer in the exposed areas with borane;

(f) providing an upper substrate with a set of parallel grooves for subsequent use as ink channels and a recess for subsequent use as a manifold, the grooves being open at one end for serving as droplet emitting nozzles, and (g) aligning, mating, and bonding the upper and lower substrates together to form a printhead with the grooves in the upper substrate being aligned with the heating elements in the lower substrate to form droplet emitting nozzles.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are different types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to vaporize almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses. At this point, the resistor is no longer being heated because the current pulse has passed and, concurrently with the bubble collapse, the droplet is propelled at a high rate of speed in a direction towards a recording medium. The surface of the printhead encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet equipment and processes are well known and are described in, for example, U.S. Pat. No. 4,601,777, U.S. Pat. No. 4,251,824, U.S. Pat. No. 4,410,899, U.S. Pat. No. 4,412,224, U.S. Pat. No. 4,532,530, and U.S. Pat. No. 4,774,530, the disclosures of each of which are totally incorporated herein by reference.

In ink jet printing, a printhead is usually provided having one or more ink-filled channels communicating with an ink supply chamber at one end and having an opening at the opposite end, referred to as a nozzle. These printheads form images on a recording medium such as paper by expelling droplets of ink from the nozzles onto the recording medium. The ink forms a meniscus at each nozzle prior to being expelled in the form of a droplet. After a droplet is expelled, additional ink surges to the nozzle to reform the meniscus.

In thermal ink jet printing, a thermal energy generator, usually a resistor, is located in the channels near the nozzles a predetermined distance therefrom. The resistors are individually addressed with a current pulse to momentarily vaporize the ink and form a bubble which expels an ink droplet. As the bubble grows, the ink bulges from the nozzle and is contained by the surface tension of the ink as a meniscus. The rapidly expanding vapor bubble pushes the column of ink filling the channel towards the nozzle. At the end of the current pulse the heater rapidly cools and the vapor bubble begins to collapse. However, because of inertia, most of the column of ink that received an impulse from the exploding bubble continues its forward motion and is ejected from the nozzle as an ink drop. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a recording medium, such as paper.

Ink jet printheads include an array of nozzles and may, for example, be formed of silicon wafers using orientation dependent etching (ODE) techniques. The use of silicon wafers is advantageous because ODE techniques can form structures, such as nozzles, on silicon wafers in a highly precise manner. Moreover, these structures can be fabricated efficiently at low cost. The resulting nozzles are generally triangular in cross-section. Thermal ink jet printheads made by using the above-mentioned ODE techniques typically comprise a channel plate which contains a plurality of nozzle-defining channels located on a lower surface thereof bonded to a heater plate having a plurality of resistive heater elements formed on an upper surface thereof and arranged so that a heater element is located in each channel. The upper surface of the heater plate typically includes an insulative layer which is patterned to form recesses exposing the individual heating elements. This insulative layer is referred to as a "pit layer" and is sandwiched between the channel plate and heater plate. For examples of printheads employing this construction, see U.S. Pat. No. 4,774,530 and U.S. Pat. No. 4,829,324, the disclosures of each of which are totally incorporated herein by reference. Additional examples of thermal ink jet printheads are disclosed in, for example, U.S. Pat. No. 4,835,553, U.S. Pat. No. 5,057,853, and U.S. Pat. No. 4,678,529, the disclosures of each of which are totally incorporated herein by reference.

U.S. Pat. No. 4,601,777 (Hawkins et al.), the disclosure of which is totally incorporated herein by reference, discloses fabricating processes for ink jet printheads, each printhead being composed of two parts aligned and bonded together. One part is a substantially flat substrate which contains on the surface thereof a lineal array of heating elements and addressing electrodes, and the second part is a substrate having at least one recess anisotropically etched therein to serve as an ink supply manifold when the two parts are bonded together. A lineal array of parallel grooves are formed in the second part, so that one end of the grooves communicates with the manifold recess and the other ends are open for use as ink droplet expelling nozzles. Many printheads can be made simultaneously by producing a plurality of sets of heating elements array with their addressing electrodes on a silicon wafer and by placing alignment marks thereon at predetermined locations. A corresponding plurality of sets of channels and associated manifolds are produced in a second silicon wafer and, in one embodiment, alignment openings are etched thereon at predetermined locations. The two wafers are aligned via the alignment openings and alignment marks, then bonded together and diced into many separate printheads.

U.S. Pat. No. 4,678,529 (Drake et al.), the disclosure of which is totally incorporated herein by reference, discloses a method of bonding ink jet printhead components together by coating a flexible substrate with a relatively thin, uniform layer of an adhesive having an intermediate non-tacky curing stage with a shelf life with around one month for ease of alignment of the parts and ease of storage of the components having the adhesive thereon. Transferring about half of the adhesive layer on the flexible substrate to the high points or lands of one of the printhead components within a predetermined time of the coating of the flexible substrate is achieved by placing it in contact therewith and applying a predetermined temperature and pressure to the flexible substrate prior to peeling it from the printhead component. This process causes the adhesive to fail cohesively in the liquid state, assuring that about half of the thickness of the adhesive layer stays with the flexible substrate and is discarded therewith, leaving a very thin uniform layer of adhesive on the printhead component lands. The transferred adhesive layer remaining on the printhead component enters an intermediate non-tacky curing stage to assist in subsequent alignment of the printhead components. The printhead components are aligned and the adhesive layer cured to complete fabrication of the printhead.

Known thermal ink jet printheads frequently include a barrier layer or pit layer of a polyimide material. Many polyimide barrier layers are unable to withstand prolonged contact with the materials commonly employed in thermal ink jet inks. Aqueous inks having a pH of 8 or more are particularly likely to cause hydrolysis and delamination of the polyimide barrier layer in a thermal ink jet printhead. While not being limited to any particular theory, it is believed that the partially cured polyimide layer is subject to hydrolytic attack when contacted with basic inks.

Accordingly, while known compositions and processes are suitable for their intended purposes, a need remains for improved thermal ink jet printheads. In addition, a need remains for thermal ink jet printheads in which the barrier layer exhibits reduced lamination upon exposure to inks.

Further, there is a need for thermal ink jet printheads with barrier layers having increased resistance to hydrolysis. Additionally, there is a need for thermal ink jet printheads which exhibit improved adhesion of the heater wafer to the channel wafer subsequent to prolonged exposure to inks. There is also a need for processes for preparing improved thermal ink jet printheads with these advantages. A further need exists for processes for curing polyimide components without the need for application of heat. Additionally, a need remains for processes for curing polyimide components wherein shrinkage of the material during curing is reduced or eliminated. A further need exists for processes for curing polyimide films without reduced stresses induced by heat cure during the imidization step.

SUMMARY OF THE INVENTION

It is an object of the present invention to provide thermal ink jet printheads with the aforementioned advantages.

It is another object of the present invention to provide improved thermal ink jet printheads.

It is yet another object of the present invention to provide thermal ink jet printheads in which the barrier layer exhibits reduced lamination upon exposure to inks.

It is still another object of the present invention to provide thermal ink jet printheads with barrier layers having increased resistance to hydrolysis.

Another object of the present invention is to provide thermal ink jet printheads which exhibit improved adhesion of the heater wafer to the channel wafer subsequent to prolonged exposure to inks.

Yet another object of the present invention is to provide processes for preparing improved thermal ink jet printheads with these advantages.

Still another object of the present invention is to provide processes for curing polyimide components without the need for application of heat.

It is another object of the present invention to provide processes for curing polyimide components wherein shrinkage of the material during curing is reduced or eliminated.

It is yet another object of the present invention to provide processes for curing polyimide films without reduced stresses induced by heat cure during the imidization step.

These and other objects of the present invention (or specific embodiments thereof) can be achieved by providing a process which comprises reacting a polyimide precursor with borane. Another embodiment of the present invention is directed to an ink jet printhead which comprises (i) an upper substrate with a set of parallel grooves for subsequent use as ink channels and a recess for subsequent use as a manifold, the grooves being open at one end for serving as droplet emitting nozzles, (ii) a lower substrate in which one surface thereof has an array of heating elements and addressing electrodes formed thereon, and (iii) a thick film layer deposited on the surface of the lower substrate and over the heating elements and addressing electrodes and patterned to form recesses therethrough to expose the heating elements and terminal ends of the addressing electrodes, said thick film layer comprising the reaction product of a polyimide precursor with borane, the upper and lower substrates being aligned, mated, and bonded together to form the printhead with the grooves in the upper substrate being aligned with the heating elements in the lower substrate to form droplet emitting nozzles. Yet another embodiment of the present invention is directed to a process for preparing an ink jet printhead which comprises the steps of:

(a) providing a photopatternable polyimide precursor polymer;

(b) depositing a thick film layer comprising the photopatternable polymer onto a lower substrate in which one surface thereof has an array of heating elements and addressing electrodes having terminal ends formed thereon, said photopatternable polymer being deposited onto the surface having the heating elements and addressing electrodes thereon;

(c) exposing the thick film layer to actinic radiation in an imagewise pattern, wherein the unexposed areas correspond to areas of the lower substrate having thereon the heating elements and the terminal ends of the addressing electrodes;

(d) removing the photopatternable polymer from the unexposed areas, thereby forming recesses in the thick film layer, said recesses exposing the heating elements and the terminal ends of the addressing electrodes;

(e) reacting the photopatternable polymer in the exposed areas with borane;

(f) providing an upper substrate with a set of parallel grooves for subsequent use as ink channels and a recess for subsequent use as a manifold, the grooves being open at one end for serving as droplet emitting nozzles; and (g) aligning, mating, and bonding the upper and lower substrates together to form a printhead with the grooves in the upper substrate being aligned with the heating elements in the lower substrate to form droplet emitting nozzles.

DETAILED DESCRIPTION OF THE INVENTION

Figure 1:
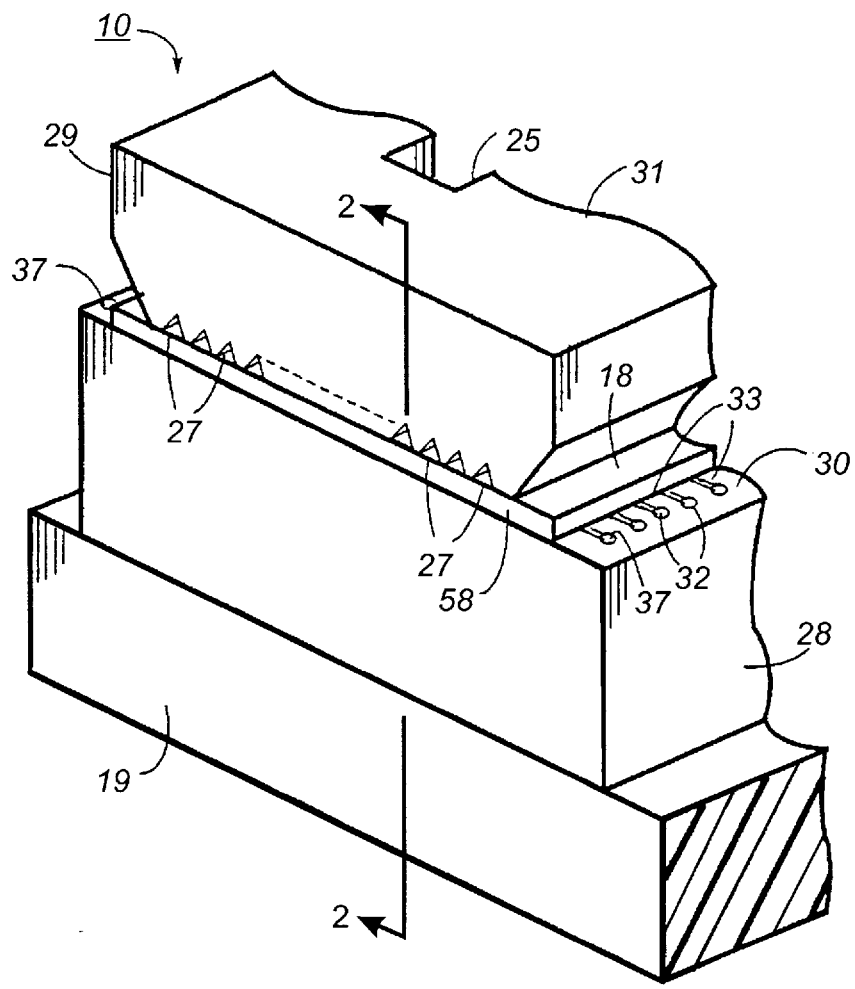
FIG. 1 is an enlarged schematic isometric view of an example of a printhead mounted on a daughter board showing the droplet emitting nozzles.

The printheads of the present invention can be of any suitable configuration. An example of a suitable configuration, suitable in this instance for thermal ink jet printing, is illustrated schematically in FIG. 1, which depicts an enlarged, schematic isometric view of the front face 29 of a printhead 10 showing the array of droplet emitting nozzles 27. Referring also to FIG. 2, discussed later, the lower electrically insulating substrate or heating element plate 28 has the heating elements 34 and addressing electrodes 33 patterned on surface 30 thereof, while the upper substrate or channel plate 31 has parallel grooves 20 which extend in one direction and penetrate through the upper substrate front face edge 29. The other end of grooves 20 terminate at slanted wall 21, the floor 41 of the internal recess 24 which is used as the ink supply manifold for the capillary filled ink channels 20, has an opening 25 therethrough for use as an ink fill hole. The surface of the channel plate with the grooves are aligned and bonded to the heater plate 28, so that a respective one of the plurality of heating elements 34 is positioned in each channel, formed by the grooves and the lower substrate or heater plate. Ink enters the manifold formed by the recess 24 and the lower substrate 28 through the fill hole 25 and by capillary action, fills the channels 20 by flowing through an elongated recess 38 formed in the thick film insulative layer 18. The ink at each nozzle forms a meniscus, the surface tension of which prevents the ink from weeping therefrom. The addressing electrodes 33 on the lower substrate or channel plate 28 terminate at terminals 32. The upper substrate or channel plate 31 is smaller than that of the lower substrate in order that the electrode terminals 32 are exposed and available for wire bonding to the electrodes on the daughter board 19, on which the printhead 10 is permanently mounted. Layer 18 is a thick film passivation layer, discussed later, sandwiched between the upper and lower substrates. This layer is etched to expose the heating elements, thus placing them in a pit, and is etched to form the elongated recess to enable ink flow between the manifold 24 and the ink channels 20. In addition, the thick film insulative layer is etched to expose the electrode terminals.

Figure 2:
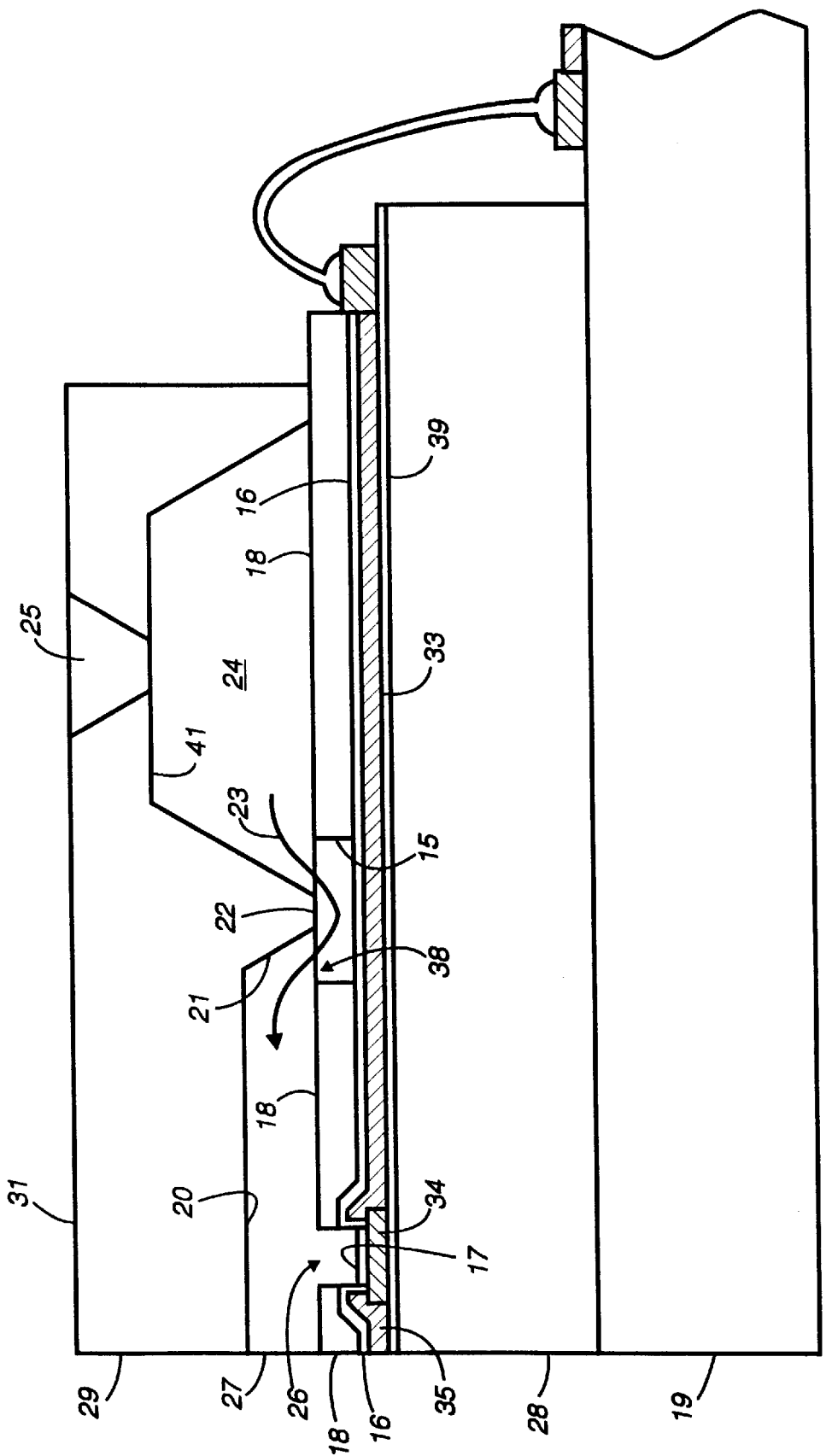
FIG. 2 is an enlarged cross-sectional view of FIG. 1 as viewed along the line 2—2 thereof and showing the electrode passivation and ink flow path between the manifold and the ink channels.

A cross sectional view of FIG. 1 is taken along view line 2—2 through one channel and shown as FIG. 2 to show how the ink flows from the manifold 24 and around the end 21 of the groove 20 as depicted by arrow 23. As is disclosed in U.S. Pat. No. 4,638,337, U.S. Pat. No. 4,601,777, and U.S. Pat. No. Re. 32,572, the disclosures of each of which are totally incorporated herein by reference, a plurality of sets of bubble generating heating elements 34 and their addressing electrodes 33 can be patterned on the polished surface of a single side polished (1,0,0) silicon wafer. Prior to patterning, the multiple sets of printhead electrodes 33, the resistive material that serves as the heating elements 34, and the common return 35, the polished surface of the wafer is coated with an underglaze layer 39 such as silicon dioxide, having a typical thickness of from about 5,000 Angstroms to about 2 microns, although the thickness can be outside this range. The resistive material can be a doped polycrystalline silicon, which can be deposited by chemical vapor deposition (CVD) or any other well known resistive material such as zirconium boride ($ZrB_2$). The common return and the addressing electrodes are typically aluminum leads deposited on the underglaze and over the edges of the heating elements. The common return ends or terminals 37 and addressing electrode terminals 32 are positioned at predetermined locations to allow clearance for wire bonding to the electrodes (not shown) of the daughter board 19, after the channel plate 31 is attached to make a printhead. The common return 35 and the addressing electrodes 33 are deposited to a thickness typically of from about 0.5 to about 3 microns, although the thickness can be outside this range, with the preferred thickness being 1.5 microns.

If polysilicon heating elements are used, they may be subsequently oxidized in steam or oxygen at a relatively high temperature, typically about 1,100° C. although the temperature can be above or below this value, for a period of time typically of from about 50 to about 80 minutes, although the time period can be outside this range, prior to the deposition of the aluminum leads, in order to convert a small portion of the polysilicon to $SiO_2$. In such cases, the heating elements are thermally oxidized to achieve an overglaze (not shown) of $SiO_2$ with a thickness typically of from about 500 Angstroms to about 1 micron, although the thickness can be outside this range, which has good integrity with substantially no pinholes.

In one embodiment, polysilicon heating elements are used and an optional silicon dioxide thermal oxide layer 17 is grown from the polysilicon in high temperature steam. The thermal oxide layer is typically grown to a thickness of from about 0.5 to about 1 micron, although the thickness can be outside this range, to protect and insulate the heating elements from the conductive ink. The thermal oxide is removed at the edges of the polysilicon heating elements for attachment of the addressing electrodes and common return, which are then patterned and deposited. If a resistive material such as zirconium boride is used for the heating elements, then other suitable well known insulative materials can be used for the protective layer thereover. Before electrode passivation, a tantalum (Ta) layer (not shown) can be optionally deposited, typically to a thickness of about 1 micron, although the thickness can be above or below this value, on the heating element protective layer 17 for added protection thereof against the cavitational forces generated by the collapsing ink vapor bubbles during printhead operation. The tantalum layer is etched off all but the protective layer 17 directly over the heating elements using, for example, $CF_4/O_2$ plasma etching. For polysilicon heating elements, the aluminum common return and addressing electrodes typically are deposited on the underglaze layer and over the opposing edges of the polysilicon heating elements which have been cleared of oxide for the attachment of the common return and electrodes.

For electrode passivation, a film 16 is deposited over the entire wafer surface, including the plurality of sets of heating elements and addressing electrodes. The passivation film 16 provides an ion barrier which will protect the exposed electrodes from the ink. Examples of suitable ion barrier materials for passivation film 16 include polyimide, plasma nitride, phosphorous doped silicon dioxide, materials disclosed hereinafter as being suitable for insulative layer 18, and the like, as well as any combinations thereof. An effective ion barrier layer is generally achieved when its thickness is from about 1000 Angstroms to about 10 microns, although the thickness can be outside this range. In 300 dpi printheads, passivation layer 16 preferably has a thickness of about 3 microns, although the thickness can be above or below this value. In 600 dpi printheads, the thickness of passivation layer 16 preferably is such that the combined thickness of layer 16 and layer 18 is about 25 microns, although the thickness can be above or below this value. The passivation film or layer 16 is etched off of the terminal ends of the common return and addressing electrodes for wire bonding later with the daughter board electrodes. This etching of the silicon dioxide film can be by either the wet or dry etching method. Alternatively, the electrode passivation can be by plasma deposited silicon nitride ($Si_3N_4$).

Next, a thick film type insulative layer 18, of a polyimide material is formed. The polyimide layer is formed by applying to passivation layer 16 a coating layer of a polyimide precursor polymer photoresist. Examples of suitable polyimide precursors include polyamic acids and polyamic esters, either with or without acrylate and/or methacrylate groups, and the like. In one specific embodiment of the present invention, the polyimide precursor is of the formula

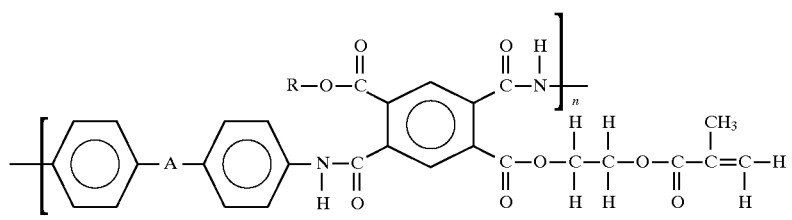

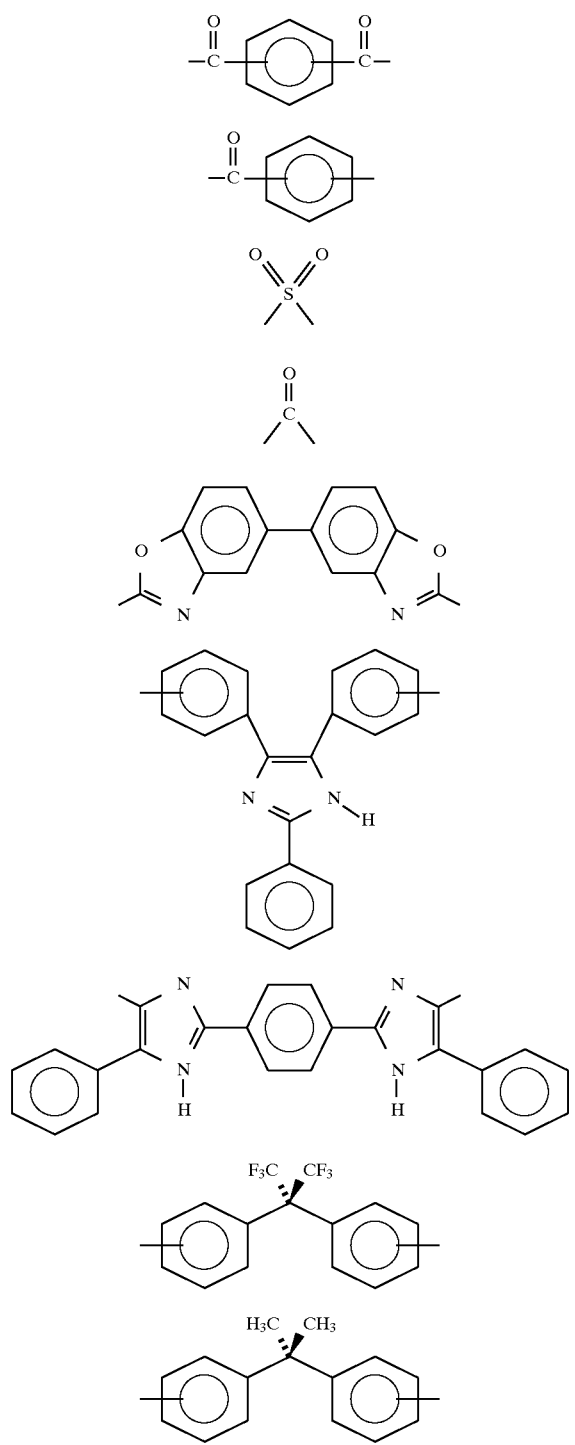

-continued wherein z is an integer of from 1 to about 20, and preferably from 1 to about 10, or mixtures thereof, wherein R can be (but is not limited to) hydrogen, an alkyl group, preferably with from 1 to about 12 carbon atoms and more preferably with from 1 to about 6 carbon atoms, although the number of carbon atoms can be outside this range, a substituted alkyl group, preferably with from 1 to about 12 carbon atoms and more preferably with from 1 to about 6 carbon atoms, although the number of carbon atoms can be outside this range, an aryl group, preferably with from 6 to about 18 carbon atoms and more preferably with about 6 carbon atoms, although the number of carbon atoms can be outside this range, a substituted aryl group, preferably with from 6 to about 18 carbon atoms and more preferably with about 6 carbon atoms, although the number of carbon atoms can be outside this range, an arylalkyl group, preferably with from 7 to about 19 carbon atoms and more preferably with from 7 to about 13 carbon atoms, although the number of carbon atoms can be outside this range, a substituted arylalkyl group, preferably with from 7 to about 19 carbon atoms and more preferably with from 7 to about 13 carbon atoms, although the number of carbon atoms can be outside this range, an acrylate group, a methacrylate group, or the like, and wherein n is an integer representing the number of repeating monomer units, and typically is from about 5 to about 65, and preferably from about 10 to about 15, although the value can be outside these ranges. In one specific embodiment, R in formula I is

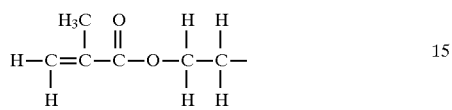

In another specific embodiment, the polyimide precursor is of the formula

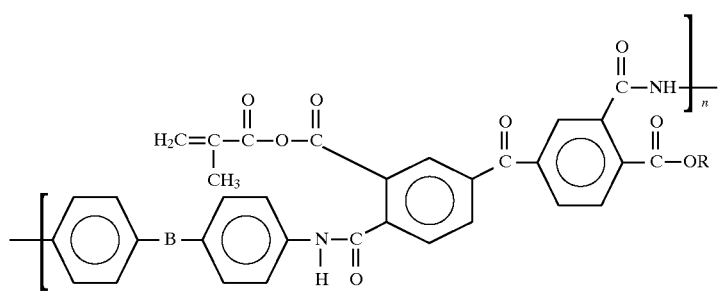

wherein B is —O—, —C(CH$_3$)$_2$—, —S—,

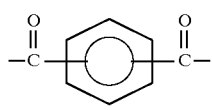

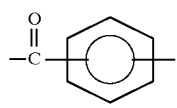

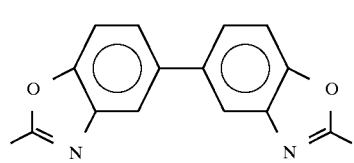

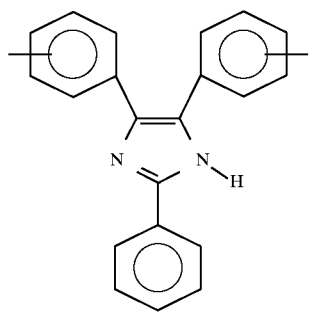

-continued

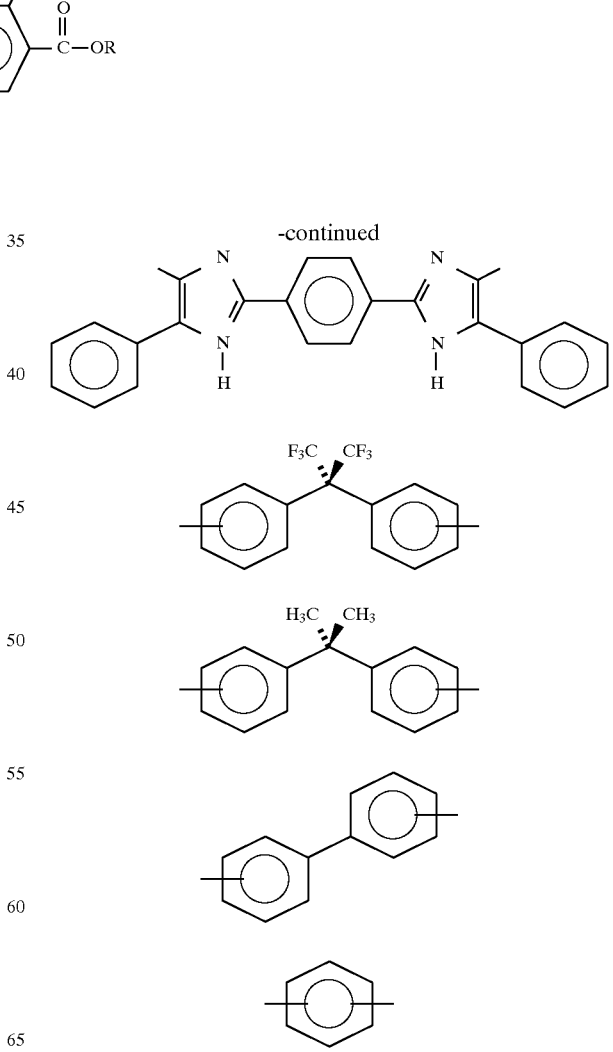

-continued

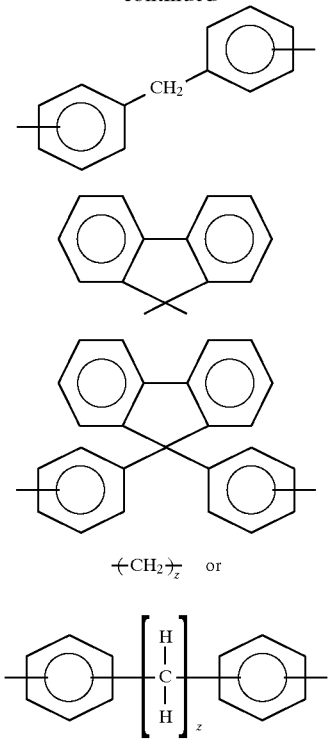

wherein z is an integer of from 1 to about 20, and preferably from 1 to about 10, or mixtures thereof, wherein R can be (but is not limited to) hydrogen, an alkyl group, preferably with from 1 to about 12 carbon atoms and more preferably with from 1 to about 6 carbon atoms, although the number of carbon atoms can be outside this range, a substituted alkyl group, preferably with from 1 to about 12 carbon atoms and more preferably with from 1 to about 6 carbon atoms, although the number of carbon atoms can be outside this range, an aryl group, preferably with from 6 to about 18 carbon atoms and more preferably with about 6 carbon atoms, although the number of carbon atoms can be outside this range, a substituted aryl group, preferably with from 6 to about 18 carbon atoms and more preferably with about 6 carbon atoms, although the number of carbon atoms can be outside this range, an arylalkyl group, preferably with from 7 to about 19 carbon atoms and more preferably with from 7 to about 13 carbon atoms, although the number of carbon atoms can be outside this range, a substituted arylalkyl group, preferably with from 7 to about 19 carbon atoms and more preferably with from 7 to about 13 carbon atoms, although the number of carbon atoms can be outside this range, an acrylate group, a methacrylate group, or the like, and wherein n is an integer representing the number of repeating monomer units, and typically is from about 5 to about 65, and preferably from about 10 to about 15, although the value can be outside these ranges. Examples of substituents on the substituted alkyl and aryl groups in formulae I and II include (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, mixtures thereof, and the like. Polyimides and polyimide precursors are widely commercially available from, for example, Ciba-Geigy (OCG), Hoboken, N.J., Toray, Hitachi, and the like. These materials can also be made by known techniques, such as those disclosed in, for example, Processes for the preparation of these materials are known, and disclosed in, for example, *Polymer*, Vol. 29, 358 (1988); *Journal of Polymer Science, Polymer Chemistry Edition*, Vol. 22, 3011 (1984); the disclosures of each of which are totally incorporated herein by reference; and the like.

The photoresist is imagewise hardened by, for example, application of heat or ultraviolet light, to generate a cross-linked or otherwise partially cured material. For example, when the specific precursor of the above formula I is employed, the partially cured or crosslinked product is believed to be of the formula

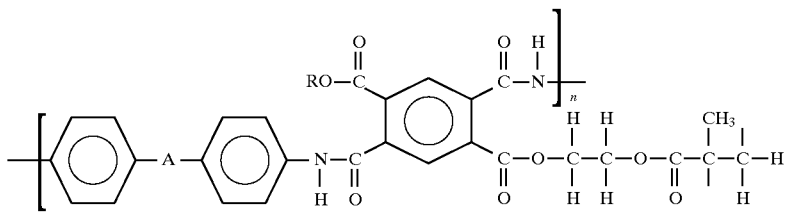

wherein crosslinking occurs at the "long" bond sites. When the specific precursor of the above formula II is employed, the crosslinked product is believed to be of the formula

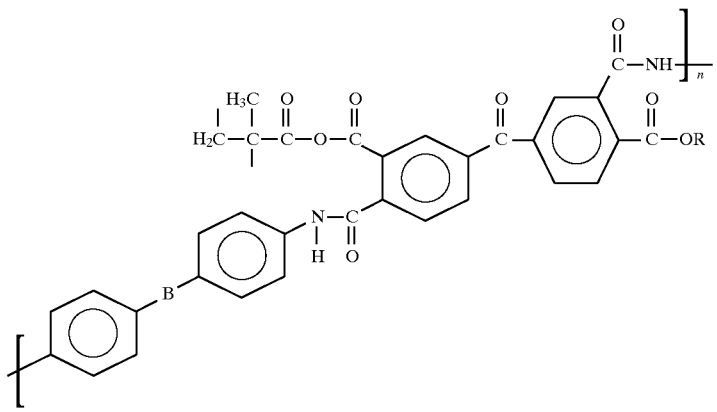

wherein crosslinking occurs at the "long" bond sites. The polyimide is then cured by the reaction with borane. For example, when the specific precursor of the above formula I is employed, the reaction product with diborane is believed to be of the formula

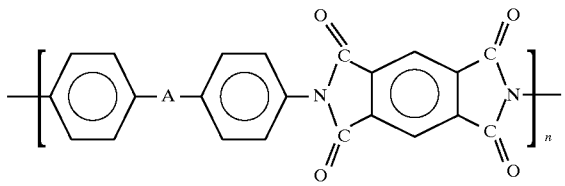

When the specific precursor of the above formula II is employed, the reaction product with diborane is believed to be of the formula

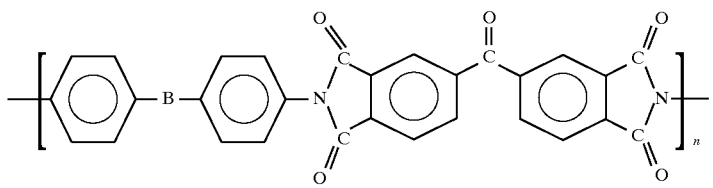

The polyimide layer typically has a thickness of from about 10 to about 100 microns and preferably in the range of from about 25 to about 50 microns, although the thickness can be outside these ranges. Even more preferably, in 300 dpi printheads, layer 18 preferably has a thickness of about 30 microns, and in 600 dpi printheads, layer 18 preferably has a thickness of from about 20 to about 22 microns, although other thicknesses can be employed. The insulative layer 18 is photolithographically processed to enable etching and removal of those portions of the layer 18 over each heating element (forming recesses 26), the elongated recess 38 for providing ink passage from the manifold 24 to the ink channels 20, and over each electrode terminal 32, 37. The elongated recess 38 is formed by the removal of this portion of the thick film layer 18. Thus, the passivation layer 16 alone protects the electrodes 33 from exposure to the ink in this elongated recess 38.

Figure 3:
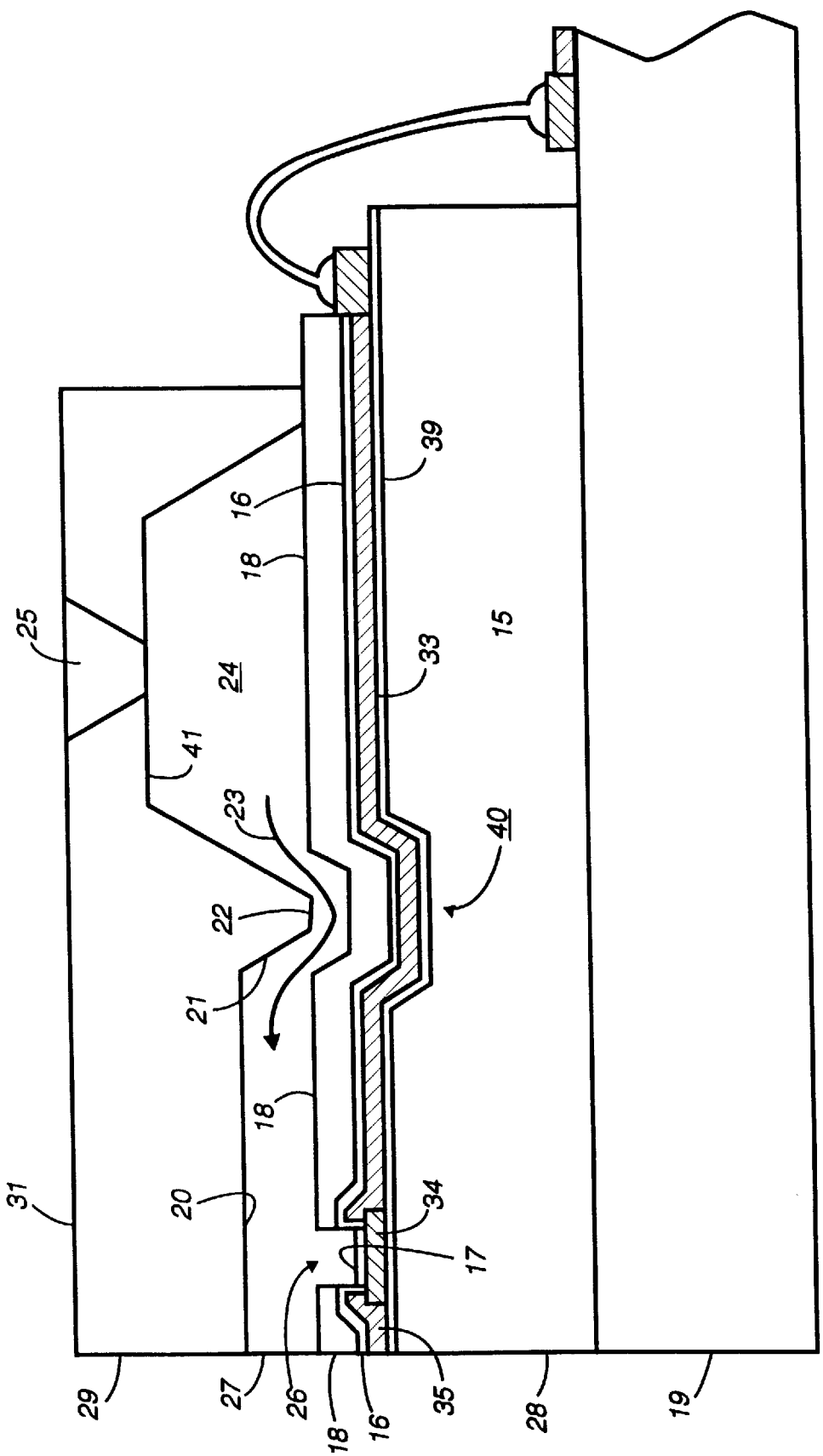
FIG. 3 is an enlarged cross-sectional view of an alternate embodiment of the printhead in FIG. I as viewed along the line 2—2 thereof.

FIG. 3 is a similar view to that of FIG. 2 with a shallow anisotropically etched groove 40 in the heater plate, which is silicon, prior to formation of the underglaze 39 and patterning of the heating elements 34, electrodes 33 and common return 35. This recess 40 permits the use of only the thick film insulative layer 18 and eliminates the need for the usual electrode passivating layer 16. Since the thick film layer 18 is impervious to water and relatively thick (typically from about 20 to about 40 microns, although the thickness can be outside this range), contamination introduced into the circuitry will be much less than with only the relatively thin passivation layer 16 well known in the art. The heater plate is a fairly hostile environment for integrated circuits. Commercial ink generally entails a low attention to purity. As a result, the active part of the heater plate will be at elevated temperature adjacent to a contaminated aqueous ink solution which undoubtedly abounds with mobile ions. In addition, it is generally desirable to run the heater plate at a voltage of from about 30 to about 50 volts, so that there will be a substantial field present. Thus, the thick film insulative layer 18 provides improved protection for the active devices and provides improved protection, resulting in longer operating lifetime for the heater plate.

When a plurality of lower substrates 28 are produced from a single silicon wafer, at a convenient point after the underglaze is deposited, at least two alignment markings (not shown) preferably are photolithographically produced at predetermined locations on the lower substrates 28 which make up the silicon wafer. These alignment markings are used for alignment of the plurality of upper substrates 31 containing the ink channels. The surface of the single sided wafer containing the plurality of sets of heating elements is bonded to the surface of the wafer containing the plurality of ink channel containing upper substrates subsequent to alignment.

As disclosed in U.S. Pat. No. 4,601,777 and U.S. Pat. No. 4,638,337, the disclosures of each of which are totally incorporated herein by reference, the channel plate is formed from a two side polished, (1,0,0) silicon wafer to produce a plurality of upper substrates 31 for the printhead. After the wafer is chemically cleaned, a pyrolytic CVD silicon nitride layer (not shown) is deposited on both sides. Using conventional photolithography, a via for fill hole 25 for each of the plurality of channel plates 31 and at least two vias for alignment openings (not shown) at predetermined locations are printed on one wafer side. The silicon nitride is plasma etched off of the patterned vias representing the fill holes and alignment openings. A potassium hydroxide (KOH) anisotropic etch can be used to etch the fill holes and alignment openings. In this case, the [1,1,1] planes of the (1,0,0) wafer typically make an angle of about 54.7 degrees with the surface of the wafer. The fill holes are small square surface patterns, generally of about 20 mils (500 microns) per side, although the dimensions can be above or below this value, and the alignment openings are from about 60 to about 80 mils (1.5 to 3 millimeters) square, although the dimensions can be outside this range. Thus, the alignment openings are etched entirely through the 20 mil (0.5 millimeter) thick wafer, while the fill holes are etched to a terminating apex at about halfway through to three-quarters through the wafer. The relatively small square fill hole is invariant to further size increase with continued etching so that the etching of the alignment openings and fill holes are not significantly time constrained.

Next, the opposite side of the wafer is photolithographically patterned, using the previously etched alignment holes as a reference to form the relatively large rectangular recesses 24 and sets of elongated, parallel channel recesses that will eventually become the ink manifolds and channels of the printheads. The surface 22 of the wafer containing the manifold and channel recesses are portions of the original wafer surface (covered by a silicon nitride layer) on which an adhesive, such as a thermosetting epoxy, will be applied later for bonding it to the substrate containing the plurality of sets of heating elements. Examples of suitable adhesives include EPON 1001 F, EPON 1004F, all available from Shell Oil Co., Houston, Tex., and the like. The adhesive is applied in a manner such that it does not run or spread into the grooves or other recesses. The alignment markings can be used with, for example, a vacuum chuck mask aligner to align the channel wafer on the heating element and addressing electrode wafer. The two wafers are accurately mated and can be tacked together by partial curing of the adhesive. Alternatively, the heating element and channel wafers can be given precisely diced edges and then manually or automatically aligned in a precision jig. Alignment can also be performed with an infrared aligner-bonder, with an infrared microscope using infrared opaque markings on each wafer to be aligned, or the like. The two wafers can then be cured in an oven or laminator to bond them together permanently. The channel wafer can then be milled to produce individual upper substrates. A final dicing cut, which produces end face 29, opens one end of the elongated groove 20 producing nozzles 27. The other ends of the channel groove 20 remain closed by end 21. However, the alignment and bonding of the channel plate to the heater plate places the ends 21 of channels 20 directly over elongated recess 38 in the thick film insulative layer 18 as shown in FIG. 2 or directly above the recess 40 as shown in FIG. 3 enabling the flow of ink into the channels from the manifold as depicted by arrows 23. The plurality of individual printheads produced by the final dicing are bonded to the daughter board and the printhead electrode terminals are wire bonded to the daughter board electrodes.

The printhead illustrated in FIGS. 1 through 3 constitutes a specific embodiment of the present invention. Any other suitable printhead configuration comprising ink-bearing channels terminating in nozzles on the printhead surface can also be employed with the materials disclosed herein to form a printhead of the present invention.

Either prior to or after application of the adhesive and mating and bonding of the channel wafer and heater wafer, the crosslinked or otherwise partially cured insulative layer 18 is treated with borane. Borane, or $BH_3$, is not known to exist in isolated form, but exists as the diborane dimer $B_2H_6$. In solutions of organic solvents such as tetrahydrofuran, however, borane can exist as the $BH_3$ monomer in the form of an acid-base complex with the solvent, as follows:

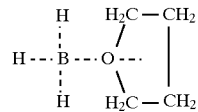

For the purposes of the present invention, the term "borane" will be used to refer both to $BH_3$ and to $B_2H_6$.

The partially cured or crosslinked precursor can be treated with gaseous borane ($B_2H_6$). For example, an autoclave with patterned, uncured or partly cured polyimide precursor coated wafers, can be purged with argon, followed by slow introduction of diborane gas over 5 minutes at 25° C. The unreacted diborane is then purged with argon, and then the treated wafers are rinsed with, in the following order, methanol, water, and methanol. The film structures as determined by FTIR spectroscopy, solvent resistance, and surface tension contact angle measurements are all consistent with fully imidized heat cured polyimide. The thermal ink jet dies fabricated from these wafers are superior to those made with heat cured polyimide with respect to die shear tests and accelerated ink immersion tests.

The partially cured or crosslinked precursor can also be treated with borane in a solvent. Examples of suitable solvents include tetrahydrofuran, dimethyl sulfide, pyridine, methylamine, and the like. The borane is present in the solution in any desired or suitable amount; typical relative amounts are from about 5 millimoles to about 50 millimoles per 360 dies, although the concentration of borane can be outside this range. A cured or partly cured polyimide precursor coated wafer is typically immersed in from about 20 to about 50 milliliters of 1 molar borane solution in tetrahydrofuran for about 5 minutes. This wafer is roughly equivalent to about 360 dies. The wafer or preformed dies are then rinsed with, in the following order, methanol, water, and methanol. The wafers are then ready for bonding. Alternatively, the soaked dies are ready to be used. There is some shear value to suggest that borane helps fully to cure the epoxy resin adhesive layer as well. The epoxy resin (EPON 1001) can be used to bond the dies.

Any desired or suitable reaction temperature may be employed. Typical reaction temperatures are from about 0° C. to about 100° C., preferably from about 15° C. to about 35° C., and more preferably about 25° C., although the temperature can be outside this range.

While not being limited to any particular theory, it is believed that treatment of the crosslinked or otherwise partially cured layer 18 with borane reduces the imide groups and crosslinks the polyimide chains, thereby increasing resistance to hydrolysis. Many polyimides can absorb as much as 2 or 3 percent of their own weight of water, which can lead to hydrolysis and delamination when the polyimide layer in the printhead is in prolonged contact with an aqueous ink. Polyimide hydrolysis and delamination can lead to significant loss in adhesion between the heater plate and the channel plate subsequent to exposure to an aqueous ink. Treatment of the polyimide layer prior to mating and bonding of the heater and channel wafers can reduce or eliminate losses in shear strength of the adhesive bond and can reduce or eliminate deterioration of the polyimide layer. Borane treatment is believed to imidize the polyamic esters to polyimide by a "cold cure" mechanism.

Further details regarding methods of fabricating printheads are disclosed in, for example, U.S. Pat. No. 4,678,529, U.S. Pat. No. 5,057,853, U.S. Pat. No. 4,774,530, U.S. Pat. No. 4,835,553, U.S. Pat. No. 4,638,337, and U.S. Pat. No. 4,601,777, the disclosures of each of which are totally incorporated herein by reference.

The present invention also encompasses printing processes with printheads according to the present invention. One embodiment of the present invention is directed to an ink jet printing process which comprises (1) preparing an ink jet printhead comprising a plurality of channels, wherein the channels are capable of being filled with ink from an ink supply and wherein the channels terminate in nozzles on one surface of the printhead, said preparation being according to the process of the present invention; (2) filling the channels with an ink; and (3) causing droplets of ink to be expelled from the nobles onto a receiver sheet in an image pattern. A specific embodiment of this process is directed to a thermal ink jet printing process, wherein the droplets of ink are caused to be expelled from the nozzles by heating selected channels in an image pattern. The droplets can be expelled onto any suitable receiver sheet, such as fabric, plain paper such as Xerox® 4024 or 4010, coated papers, transparency materials, or the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Thermal ink jet printhead heater wafers were prepared with silicon microelectronic fabrication methods using a polyimide photoresist (polyamic acid methacrylate ester OCG or HTR, obtained from OCG, Hoboken, N.J.) applied in three layers to etch device topography and produce a 30 micron film on the heater wafer. One heater wafer was dipped into 20 milliliters of a 1 Molar solution of borane in tetrahydrofuran (obtained from Aldrich Chemical Co., St. Louis, Mo.) for 5 minutes. A second heater wafer was dipped into a fresh 40 milliliters of a 1 Molar solution of borane in tetrahydrofuran for 14 minutes. A third heater wafer was immersed in another 40 milliliters of a 1 Molar solution of borane in tetrahydrofuran for 15 minutes. The wafers were indistinguishable with respect to performance, but sufficient borane complex was required to immerse the polyimide material completely. The wafers were then washed first with methanol, second with water, and third with methanol, and then air dried. The heater wafers were then bonded to channel wafers with EPON 1001 epoxy. Two additional heater wafers were not treated with borane, but were made directly into printheads by the same process. The initial shear strength of the bond between the heater wafer and the channel wafer in all four printheads was about 4,000 pounds per square inch.

The printheads thus prepared were immersed in an aqueous ink containing 11.52 percent by weight X-34 Dye (BASF) Liquid Concentrate, 20 percent by weight ethylene glycol, 3 percent by weight isopropanol, 0.1 percent by weight polyethylene oxide, 0.1 percent by weight of a biocide, and 65.28 percent by weight water for a period of about 10 days at 60° C. After more than 10 days, the borane treated printheads exhibited no change in the bond strength adhesion between the heater plate and the channel plate, whereas the printheads which had not been treated with borane exhibited a greater than 25 percent drop in adhesion, as determined by die shear tests and scanning electron microscopy to identify the failure modes.

The process was repeated with five additional printheads wherein the printheads were immersed in an aqueous ink containing 10 percent by weight ProJet cyan dye (ICI), 15.46 percent by weight sulfolane, 10 percent by weight butyl carbitol, 2 percent by weight cyclohexyl pyrrolidone, 0.03 percent by weight polyethylene oxide, and 0.05 percent by weight of a biocide, and 62.46 percent by weight water, said ink having a pH of about 8, for a period of 10 days at 60° C. After 10 days, the borane treated printheads exhibited a loss of 25 percent in the bond strength adhesion between the heater plate and the channel plate, whereas the printheads which had not been treated with borane exhibited complete destruction, as evidenced by delamination and disintegration of the polyimide layer.

EXAMPLE II

Fabricated TIJ printheads were treated with borane as follows. Fully prepared TIJ dies (diced from bonded wafers) were soaked in 40 milliliters of 1 molar borane in tetrahydrofuran (borane/THF complex, obtained from Aldrich Chemical Co., Milwaukee, Wis.) for 5 minutes. Methanol was added dropwise to quench the reagent as evidenced by vigorous gasing. The dies were collected, washed with, in the following order, methanol (100 milliliters), water (500 milliliters), and methanol (100 milliliters). The dies were then air dried. Thereafter, the dies were tested by immersion in aqueous thermal ink jet inks of the composition indicated in Example I. The soaked dies were shear tested and then inspected using scanning electron microscopy. It was anticipated that the borane would reduce the polyamic acid (the precursor to polyimide) and would also react with the EPON 1001 adhesive used to bond the die and form a more solid network with the epoxy adhesive. The process was repeated using 20 milliliters of the borane/THF complex. In both cases, the dies demonstrated improved resistance in ink soak tests and improved bond strength in die shear tests compared to printheads of the same composition which had not been exposed to borane.

EXAMPLE III

Polyamic acid methacrylate ester photoresist polyimide precursor (available as OCG or HTR polyimide photoresist from OCG, Hoboken, N.J.) was spin coated onto silicon wafers and was then photoexposed and developed to form 300 dot per inch features. The uncured film was then B-stage cured until the resist was no longer tacky to the touch by heat curing the film to 120° C. Ordinarily, this level of cure leads to delamination of the film in ink soak tests. However, after exposure to 20 milliliters of a borane/THF complex (Aldrich) for 5 minutes, the film did not delaminate and the adhesion of the resultant polyimide film to silicon remained excellent. The contact angle surface tension of the film was consistent with that of a fully cured polyimide film, that is, one which had been heated to 350° C. for at least 4 hours. Moreover, the FTIR spectrum of the borane treated film was consistent with a fully imidized polyimide structure, and not consistent with one which had been reduced. The film was resistant to ink soak tests which would destroy uncured polyimide films. Thus, the evidence suggests that borane is an effective reagent for the cold temperature imidization of polyamic acids and polyamic acid esters to form polyimide. The films displayed little shrinkage during cure and consequently were relatively stress free compared with heat cured materials.

EXAMPLE IV

Two fully cured polyimide films on silicon wafers prepared as described in Example III were treated for 5 minutes, one in 20 milliliters of borane/THF complex and one in 40 milliliters of borane/THF complex. The wafers were then washed with, in the following order, methanol, water, and methanol. The adhesion of the films to silicon remained excellent; however, the ink solvent resistance of the borane treated films was superior to untreated control films. The process was repeated with two more under-cured polyimide films on silicon wafers. When treated with 20 milliliters and 40 milliliters of 1 molar borane/THF complex for 5 minutes, the film structures as determined by FTIR spectroscopy, solvent resistance, and surface tension as determined by contact angle surface measurements were consistent with heat cured polyimide.

EXAMPLE V

An autoclave with patterned, partly cured polyimide coated wafers was purged first with argon and then with diborane gas, followed by slow introduction of diborane gas into the autoclave over 5 minutes at 25° C. The unreacted diborane was purged with argon, and the treated wafers were then rinsed with, in the following order, methanol, water, and methanol. The film structures as determined by FTIR spectroscopy, solvent resistance, and surface tension contact angle measurements were all consistent with fully imidized heat cured polyimide. Thermal ink jet dies fabricated from the wafers were superior to those made with heat cured polyimide with respect to die shear tests and accelerated ink immersion tests.

EXAMPLE VI

Preparation of a photoactive polyimide photoresist: In a 100 milliliter, 3-neck round bottom flask equipped with a mechanical stirrer, distillation take-off head, and nitrogen inlet was placed 0.0279 mol of pyromellitic dianhydride (or another aromatic dianhydride) and 30 milliliters of absolute methanol. The mixture was warmed in an oil bath until a clear solution formed. Then 0.0279 mol of an aromatic or aliphatic diamine was added quantitatively, followed by removal of the methanol using a silicone oil bath set at 100° C. The residue was heated under nitrogen to 130° C. oil bath temperature, and was then maintained at 130° C. for 1 hour.

The residue was dissolved in N-methyl pyrrolidinone at 15 percent by weight solids and was added to methanol (1 liter) to precipitate a yellow polymer. The vacuum dried polymer in N-methyl pyrrolidinone at 15 percent by weight solids was subsequently treated with 1 equivalent (0.02 mol) of thionyl chloride and then heated in a silicone oil bath at 50° C. for 4 hours. The volatiles were removed under reduced pressure using a vacuum pump trapped with liquid nitrogen. Thereafter, 0.02 mol of hydroxyethyl acrylate was added dropwise with mechanical stirring at 25° C. Continuous stirring was maintained for 16 hours. The solution was then added to methanol (1 liter) to precipitate the polymer. The vacuum dried polymer was subsequently dissolved in N-methyl pyrrolidinone at 40 weight percent solids and used as a photoresist solution. (Alternatively, hydroxyethyl methacrylate can be substituted for hydroxyethyl acrylate.) The thionyl chloride step can be omitted by reaction of acid groups of the polyamic acid (polyimide precursor) polymer with isocyanato-ethyl methacrylate or by reaction of polymer bound acid groups with acrylic acid anhydride or methacrylic acid anhydride. The reaction scheme is as follows:

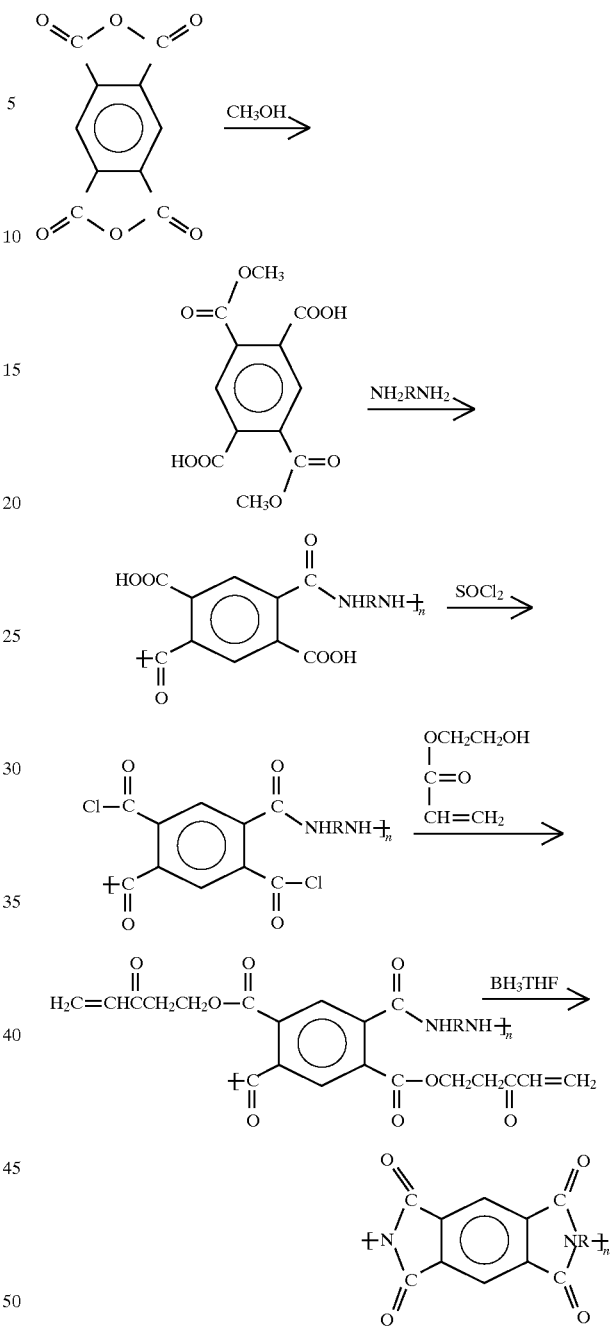

Other embodiments and modifications of the present invention may occur to those skilled in the art subsequent to a review of the information presented herein; these embodiments and modifications, as well as equivalents thereof, are also included within the scope of this invention.

What is claimed is:

1. An ink jet printhead which comprises (i) an upper substrate with a set of parallel grooves for subsequent use as ink channels and a recess for subsequent use as a manifold, the grooves being open at one end for serving as droplet emitting nozzles, (ii) a lower substrate in which one surface thereof has an array of heating elements and addressing electrodes formed thereon, and (iii) a thick film layer deposited on the surface of the lower substrate and over the heating elements and addressing electrodes and patterned to form recesses therethrough to expose the heating elements and terminal ends of the addressing electrodes, said thick film layer comprising the reaction product of a polyimide precursor with borane, the upper and lower substrates being aligned, mated, and bonded together to form the printhead with the grooves in the upper substrate being aligned with the heating elements in the lower substrate to form droplet emitting nozzles.

2. A printhead according to claim 1 wherein the polyimide precursor is of the formula

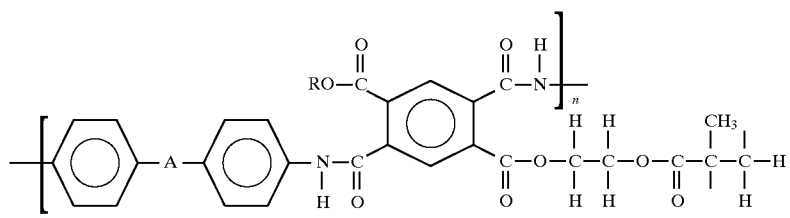

wherein A is —O—, —C(CH$_3$)$_2$—, —S—,

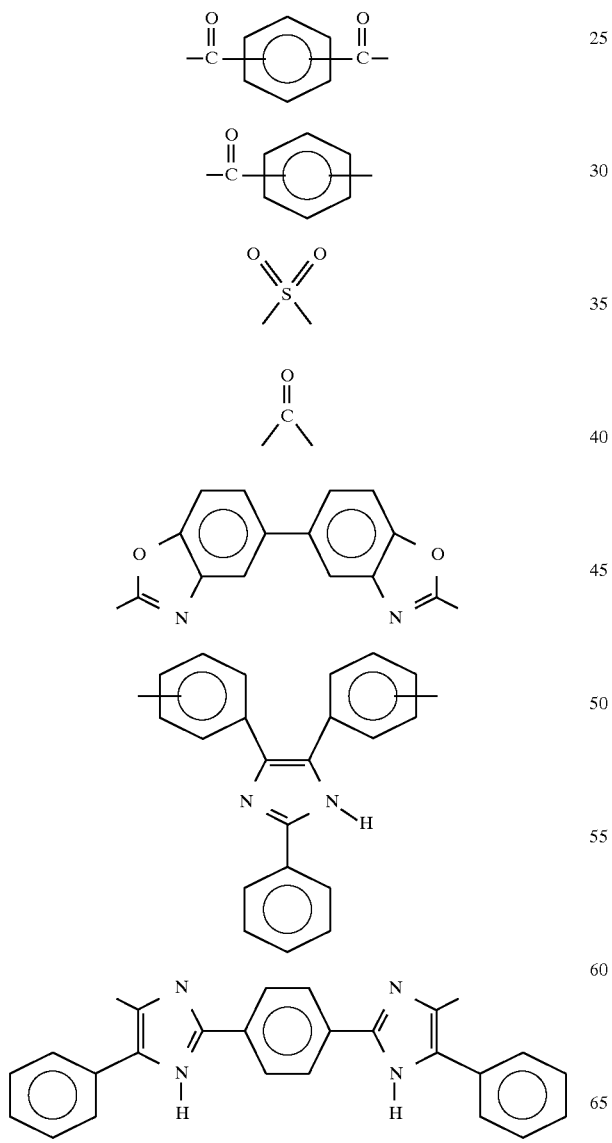

-continued

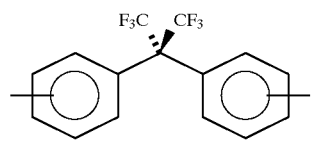

-continued

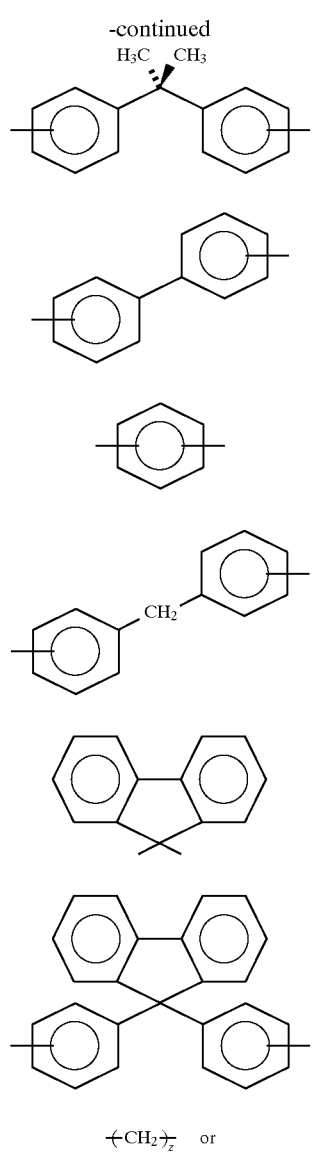

—(CH$_2$)$_z$—  or

-continued
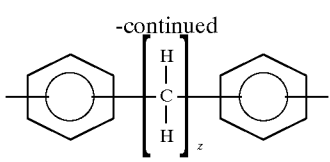
wherein z is an integer of from 1 to about 20, or mixtures thereof, and wherein n is an integer representing the number of repeating monomer units, or
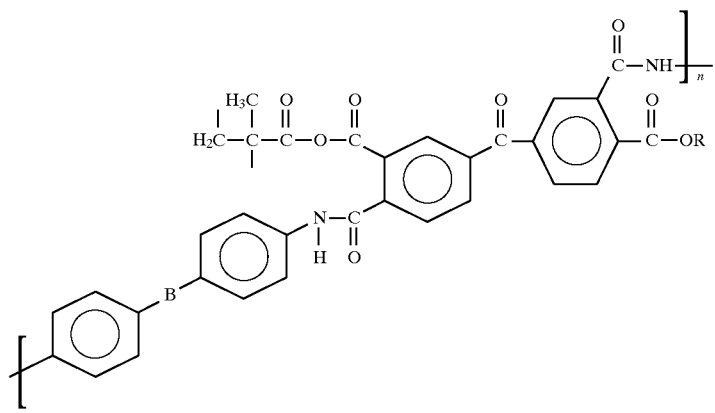
wherein B is —O—, —C(CH$_3$)$_2$—, —S—,
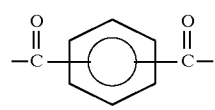
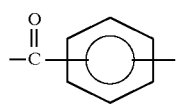
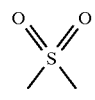
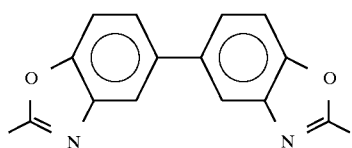
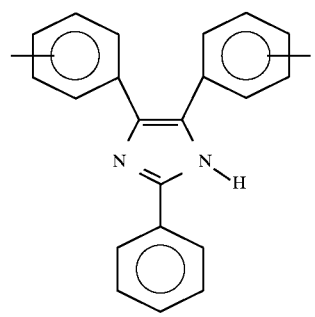
-continued
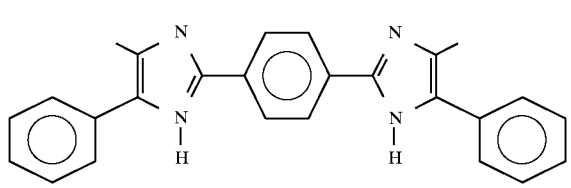
-continued
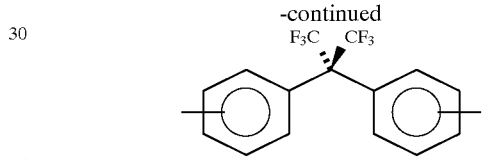
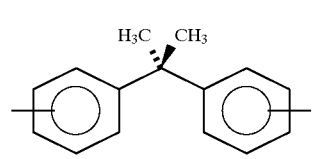
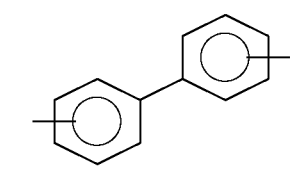
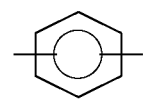
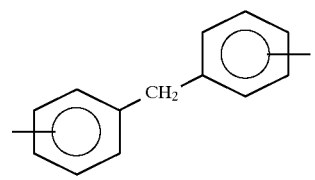
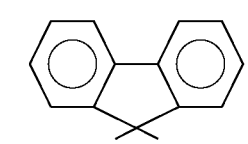

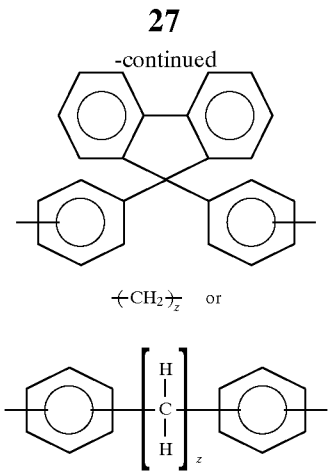

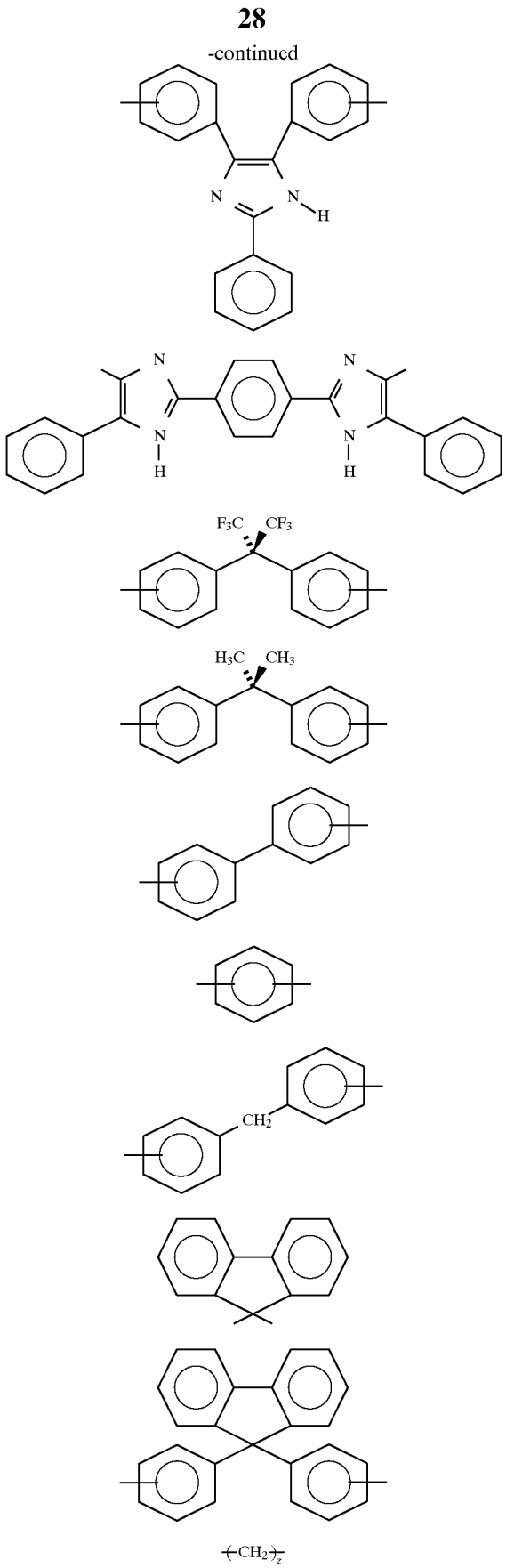

wherein z is an integer of from 1 to about 20, or mixtures thereof, wherein R is hydrogen, an alkyl group, a substituted alkyl group, an aryl group, a substituted aryl group, an arylalkyl group, a substituted arylalkyl group, an acrylate group, a methacrylate group, or a mixture thereof, and wherein n is an integer representing the number of repeating monomer units, or mixtures thereof.

3. A printhead according to claim 2 wherein n is an integer of from about 5 to about 65.

4. A printhead according to claim 2 wherein n is an integer of from about 10 to about 15.

5. A printhead according to claim 1 wherein the reaction generates a material comprising a polymer of the formula wherein A is —O—, —C(CH$_3$)$_2$—, —S—, -continued
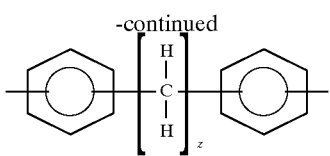
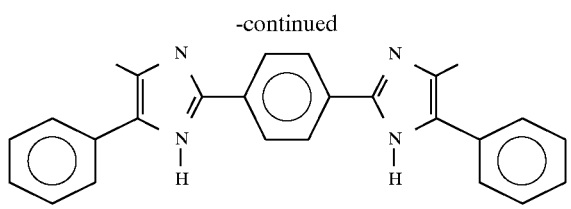
wherein z is an integer of from 1 to about 20, or mixtures thereof, and wherein n is an integer representing the number of repeating monomer units.
6. A printhead according to claim 1 wherein the reaction generates a material comprising a polymer of the formula
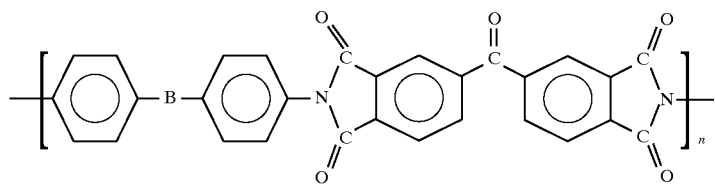
wherein B is —O—, —C(CH$_3$)$_2$—, —S—,
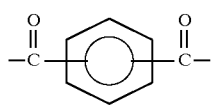
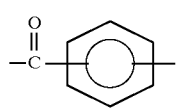
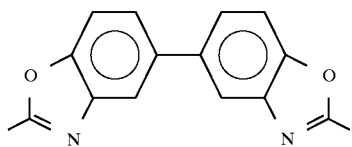
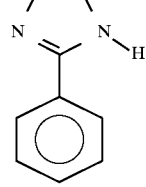
-continued
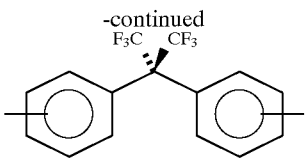
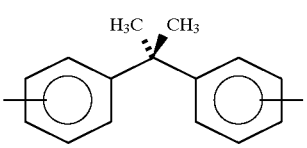
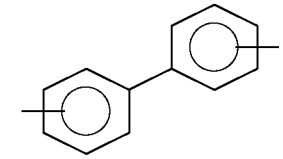
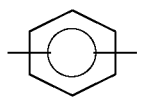
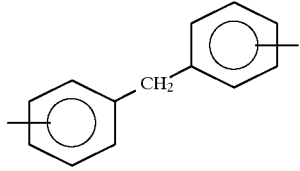
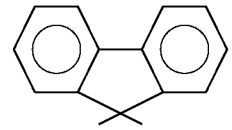
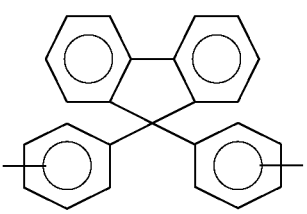

-continued

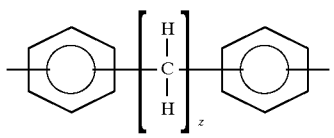

wherein z is an integer of from 1 to about 20, or mixtures thereof, and wherein n is an integer representing the number of repeating monomer units.

7. A process for preparing an ink jet printhead which comprises the steps of:
(a) providing a photopatternable polyimide precursor polymer;
(b) depositing a thick film layer comprising the photopatternable polymer onto a lower substrate in which one surface thereof has an array of heating elements and addressing electrodes having terminal ends formed thereon, said photopatternable polymer being deposited onto the surface having the heating elements and addressing electrodes thereon;
(c) exposing the thick film layer to actinic radiation in an imagewise pattern, wherein the unexposed areas correspond to areas of the lower substrate having thereon the heating elements and the terminal ends of the addressing electrodes;
(d) removing the photopatternable polymer from the unexposed areas, thereby forming recesses in the thick film layer, said recesses exposing the heating elements and the terminal ends of the addressing electrodes;
(e) reacting the photopatternable polymer in the exposed areas with borane;
(f) providing an upper substrate with a set of parallel grooves for subsequent use as ink channels and a recess for subsequent use as a manifold, the grooves being open at one end for serving as droplet emitting nozzles; and
(g) aligning, mating, and bonding the upper and lower substrates together to form a printhead with the grooves in the upper substrate being aligned with the heating elements in the lower substrate to form droplet emitting nozzles.

8. A process according to claim 7 wherein the borane is in gas form.

9. A process according to claim 7 wherein the borane is present in an organic solvent.

10. A process according to claim 9 wherein the organic solvent is selected from the group consisting of tetrahydrofuran, dimethyl sulfide, pyridine, methylamine, and mixtures thereof.

11. A process according to claim 7 wherein the reaction takes place at a temperature of from about 0° to about 100° C.

12. A process according to claim 7 wherein the reaction takes place at a temperature of from about 15° to about 35° C.

13. A process according to claim 7 wherein the polyimide precursor is a polyamic acid or polyamic ester.

14. A process according to claim 7 wherein the polyimide precursor is of the formula

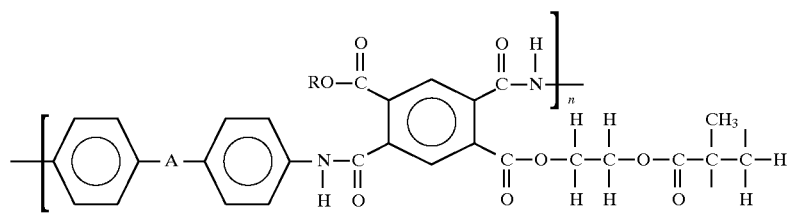

wherein A is —O—, —C(CH$_3$)$_2$—, —S—

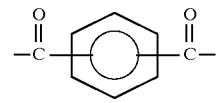

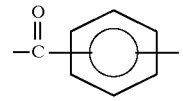

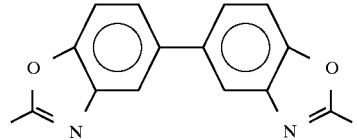

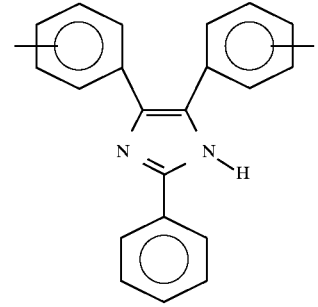

-continued
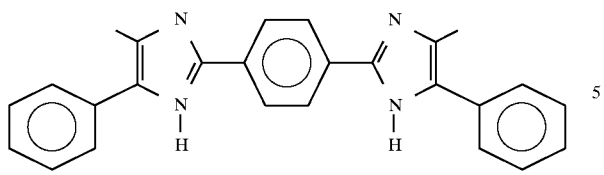
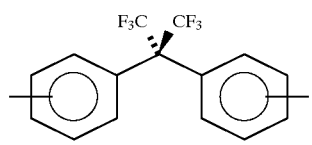
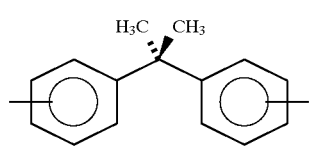
-continued
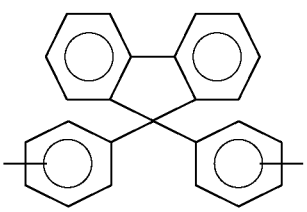
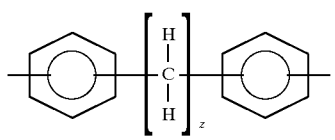
wherein z is an integer of from 1 to about 20, or mixtures thereof, and wherein n is an integer representing the number of repeating monomer units, or
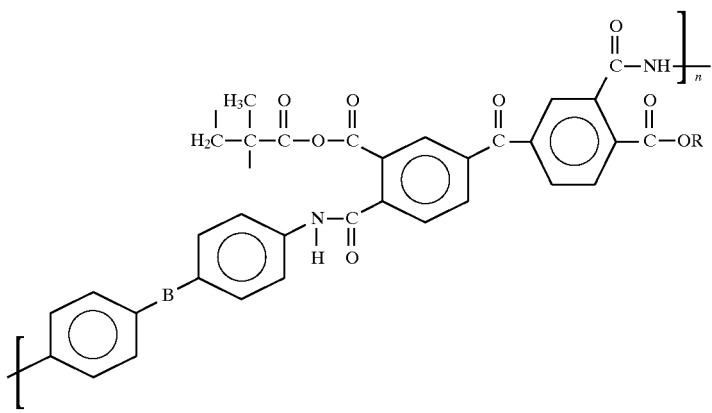
-continued
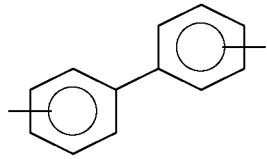
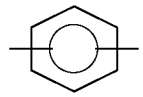
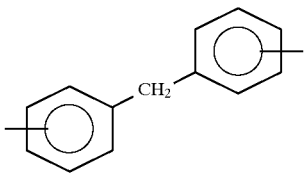
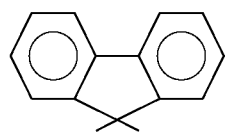
wherein B is —O—, —C(CH$_3$)$_2$—, —S—,
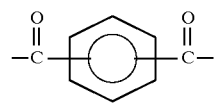
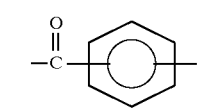

-continued

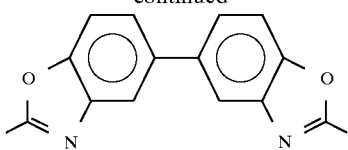

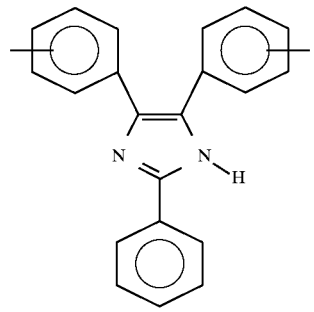

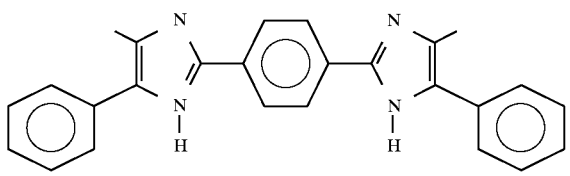

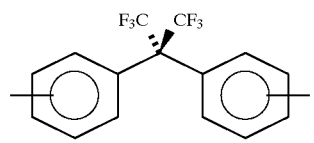

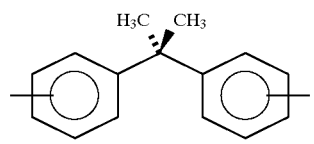

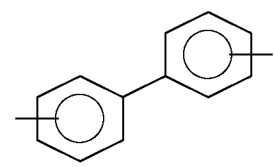

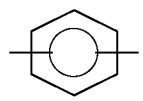

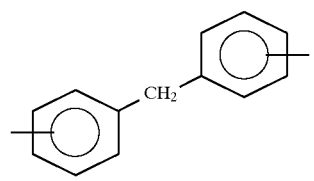

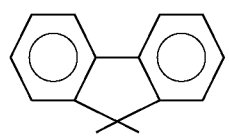

-continued

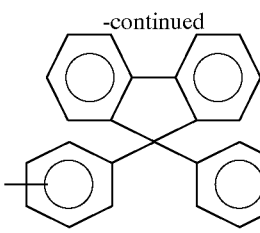

$+CH_2+_z$ or

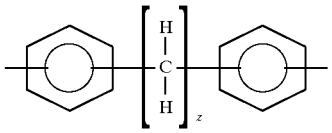

wherein z is an integer of from 1 to about 20, or mixtures thereof, wherein R is hydrogen, an alkyl group, a substituted alkyl group, an aryl group, a substituted aryl group, an arylalkyl group, a substituted arylalkyl group, an acrylate group, a methacrylate group, or a mixture thereof, and wherein n is an integer representing the number of repeating monomer units, or mixtures thereof.

15. A process according to claim 14 wherein n is an integer of from about 5 to about 65.

16. A process according to claim 14 wherein n is an integer of from about 10 to about 15.

17. A process according to claim 7 wherein the reaction generates a material comprising a polymer of the formula

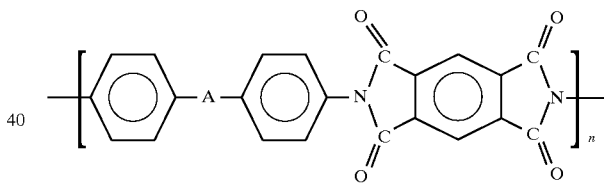

wherein A is —O—, —C(CH$_3$)$_2$—, —S—,

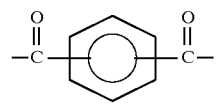

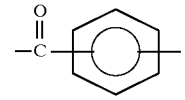

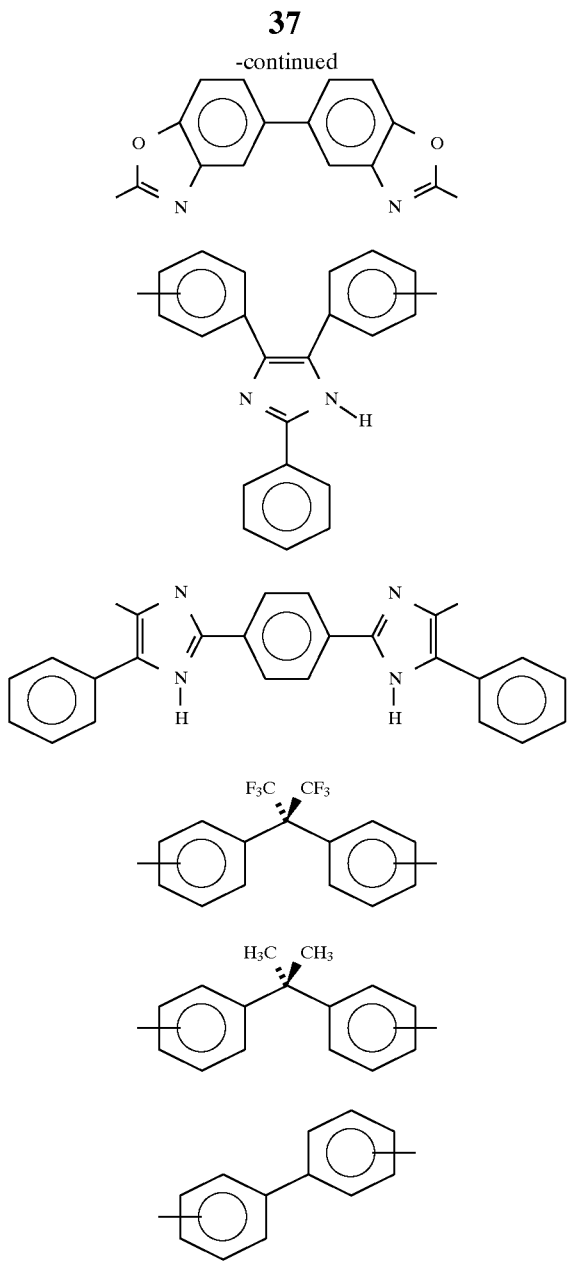
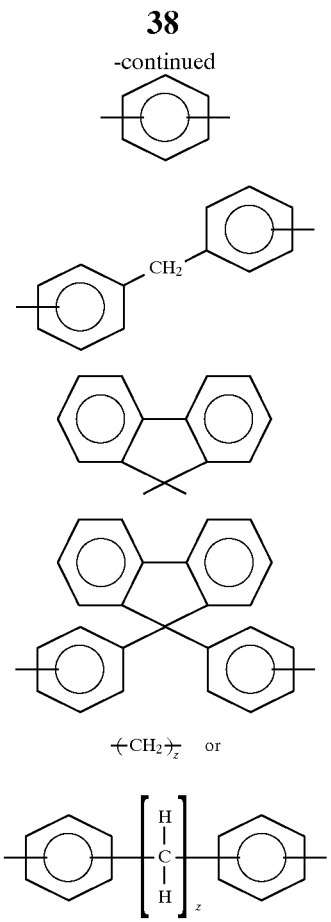
wherein z is an integer of from 1 to about 20, or mixtures thereof, and wherein n is an integer representing the number of repeating monomer units.
18. A process according to claim 7 wherein the reaction generates a material comprising a polymer of the formula
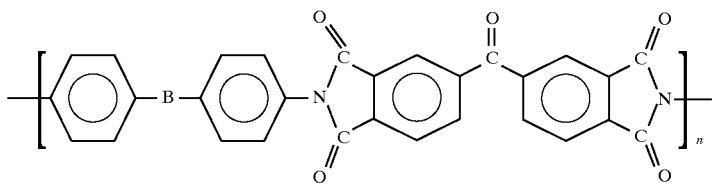

wherein B is —O—, —C(CH$_3$)$_2$—, —S—,
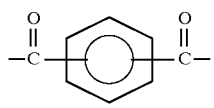
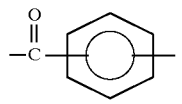
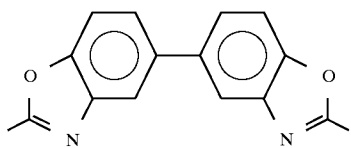
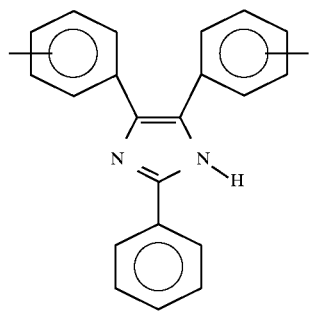
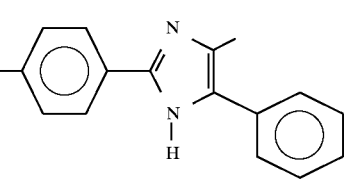
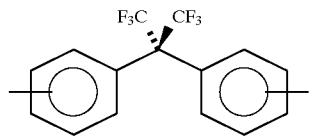
-continued
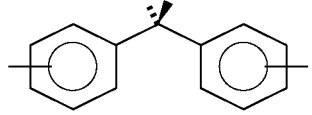
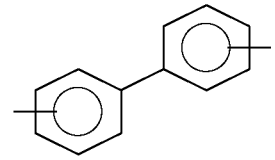
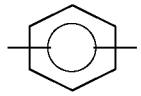
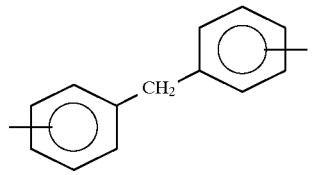
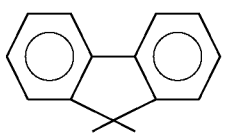
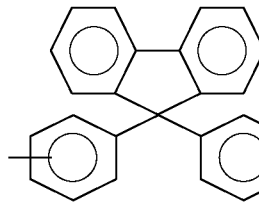
—(CH$_2$)$_z$— or
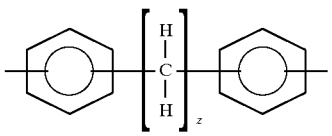
wherein z is an integer of from 1 to about 20, or mixtures thereof, and wherein n is an integer representing the number of repeating monomer units.
* * * * *